United States Patent
Skilton et al.

(10) Patent No.: US 12,037,832 B2
(45) Date of Patent: Jul. 16, 2024

(54) ACCESS SYSTEMS AND METHODS FOR A VEHICLE

(71) Applicant: THE BOEING COMPANY, Chicago, IL (US)

(72) Inventors: Richard A. Skilton, Bothell, WA (US); Michael A. Fleming, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 17/832,751

(22) Filed: Jun. 6, 2022

(65) Prior Publication Data
US 2023/0392428 A1 Dec. 7, 2023

(51) Int. Cl.
*B64C 1/14* (2006.01)
*B64C 1/20* (2006.01)
*E05F 15/63* (2015.01)

(52) U.S. Cl.
CPC .............. *E05F 15/63* (2015.01); *B64C 1/143* (2013.01); *B64C 1/20* (2013.01); *E05Y 2201/434* (2013.01); *E05Y 2201/624* (2013.01); *E05Y 2201/686* (2013.01); *E05Y 2400/40* (2013.01); *E05Y 2900/502* (2013.01)

(58) Field of Classification Search
CPC .............. E05F 15/63; E05Y 2201/434; E05Y 2201/624; E05Y 2201/686; E05Y 2400/40; E05Y 2900/502; B64C 1/20; B64C 1/143
See application file for complete search history.

(56) References Cited

U.S. PATENT DOCUMENTS

| | | | | |
|---|---|---|---|---|
| 3,416,757 A | * | 12/1968 | Maraghe | B64C 1/1415 244/129.5 |
| 3,718,171 A | * | 2/1973 | Godwin | B64C 1/1415 244/129.5 |
| 4,473,201 A | * | 9/1984 | Barnes | B64C 1/1415 292/216 |
| 4,510,714 A | * | 4/1985 | Kasper | B64C 1/1415 49/249 |
| 4,680,891 A | * | 7/1987 | Perkins | E05F 15/53 244/129.5 |
| 5,823,473 A | * | 10/1998 | Odell | B64C 1/1415 292/216 |
| 6,334,276 B1 | * | 1/2002 | Marin-Martinod | E05F 15/603 74/89.26 |

(Continued)

FOREIGN PATENT DOCUMENTS

EP 0105082 4/1984
EP 3680165 7/2020

OTHER PUBLICATIONS

Extended European Search Report for EP App. No. 23171387.6-1004, dated Nov. 10, 2023.

*Primary Examiner* — Tye William Abell
(74) *Attorney, Agent, or Firm* — Joseph M. Butscher; The Small Patent Law Group LLC

(57) ABSTRACT

An access system for a vehicle includes a door moveably coupled to a portion of a fuselage. The door is configured to be moved between an open position in which an opening of an internal chamber is opened, and a closed position in which the opening of the internal chamber is closed. One or more actuators are secured to the door. The one or more actuators are configured to move the door between the open position and the closed position.

20 Claims, 11 Drawing Sheets

(56) References Cited

U.S. PATENT DOCUMENTS

2016/0083071 A1* 3/2016 Pichlmaier ............ B64C 1/1423
  92/76
2018/0304982 A1* 10/2018 Curry .................... B64C 1/1415
2020/0223525 A1* 7/2020 Jackson .................... B64C 1/22

* cited by examiner

ACCESS SYSTEMS AND METHODS FOR A VEHICLE

FIELD OF THE DISCLOSURE

Examples of the present disclosure generally relate to access systems and methods for a vehicle, which include doors that allow access into one or more portions of the vehicle.

BACKGROUND OF THE DISCLOSURE

Commercial aircraft are used to transport passengers between various locations. A commercial aircraft includes various internal chambers within a fuselage. Doors are used to gain access to the internal chambers. As an example, front access doors lead into an internal cabin of an aircraft. As another example, a cargo door provides access to a cargo hold of the aircraft.

A known type of cargo door is a plug door. One or more actuators are used to open and close the plug door in relation to a fuselage. Typically, the actuators are embedded within in and/or otherwise secured to a floor that separates the cargo hold from a passenger area of the aircraft. However, the actuators take up space within the floor structure, which can lead to a smaller cargo hold and/or reduced space within the passenger area. Further, it has been found that installing the actuators within the floor is time and labor intensive.

SUMMARY OF THE DISCLOSURE

A need exists for a door of a vehicle, such as a commercial aircraft, which can be efficiently manufactured. Further, a need exists for a plug door of a vehicle that allows for increased space and capacity within an internal cabin. Also, a need exists for a plug door that exerts less stress and fatigue on a floor of a vehicle. Additionally, a need exists for an efficient and effective method of manufacturing a plug door of a vehicle. Also, a need exists for an efficient method of operating a plug door of a vehicle.

With those needs in mind, certain examples of the present disclosure provide an access system for a vehicle. The access system includes a door moveably coupled to a portion of a fuselage. The door is configured to be moved between an open position in which an opening of an internal chamber is opened, and a closed position in which the opening of the internal chamber is closed. One or more actuators are secured to the door. The one or more actuators are configured to move the door between the open position and the closed position.

In at least one example, the access system also includes one or more linkages coupled to the one or more actuators. The one or more actuators are configured to move the one or more linkages to move the door between the open position and the closed position. In at least one example, the one or more linkages connect to a portion of a floor within the fuselage. As a further example, the one or more linkages connect to an underside of the portion of the floor.

The one or more actuators are separated from the floor within the fuselage.

In at least one example, the door is a plug door that is configured to mate with a socket frame surrounding the opening when the door is in the closed position.

In at least one example, the internal chamber includes a cargo hold of the vehicle.

In at least one example, the vehicle is an aircraft.

The one or more actuators can include one or more rotary motors. As another example, the one or more actuators can include one or more linear motors.

In at least one example, the access system also includes a control unit configured to control operation of the one or more actuators.

In at least one example, the one or more actuators are secured to a mounting plate that is mounted on an internal surface of the door.

Certain examples of the present disclosure provide a method of manufacturing an access system for a vehicle. The method includes coupling a door to a portion of a fuselage, wherein the door is configured to be moved between an open position in which an opening of an internal chamber is opened, and a closed position in which the opening of the internal chamber is closed; and securing one or more actuators to the door, wherein the one or more actuators are configured to move the door between the open position and the closed position.

Certain examples of the present disclosure provide an aircraft including a fuselage including a floor over a cargo hold having an opening formed in the fuselage; and an access system, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide a plug door, such as for a cargo hold of an aircraft, which includes a simple attachment to a portion of a fuselage. In at least one example, an access system includes a door, and one or more actuators secured to the door. The actuator(s) may not be mounted to or otherwise secured to a floor of the aircraft. The actuator(s) are not embedded within the floor. By providing the actuator(s) on and/or within the door (instead of the floor), the floor can be more easily and quickly manufactured, and the door can be quickly and easily installed in relation to a fuselage of the aircraft. Further, a floor that does not include embedded actuators can have a smaller depth.

Certain examples of the present disclosure provide a plug cargo door for an aircraft. One or more actuators are mounted onto and/or within the plug cargo door, in contrast to being mounted to a floor within the fuselage. The actuator(s) are located on and/or within the door itself. In at least one example, the actuator(s) is attached to a secondary structure, such as a plate. In turn, the secondary structure is coupled to links, tracks, or the like that allow the door to translate, for example.

By providing the actuators on and/or within the door, lighter floors can be used, as less space within the floor is required (such space no longer needing to be large enough to accommodate actuators for doors).

Figure 1:
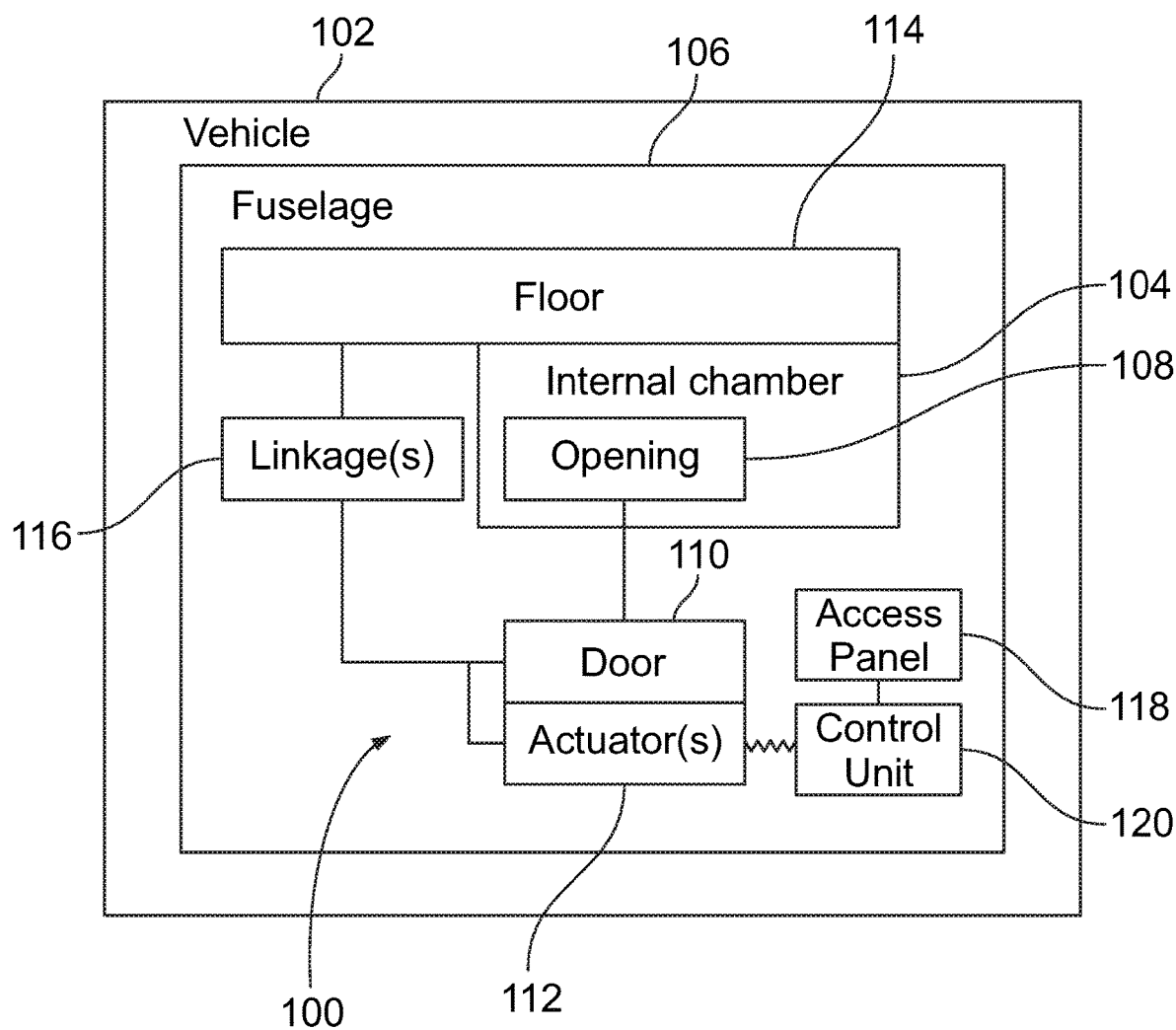
FIG. 1 illustrates a schematic block diagram for an access system for a vehicle, according to an example of the present disclosure.

FIG. 1 illustrates a schematic block diagram for an access system 100 for a vehicle 102, according to an example of the present disclosure. In at least one example, the vehicle 102 is an aircraft, such as a commercial jet. As another example, the vehicle 102 can be an unmanned aerial vehicle, a helicopter, or the like. As another example, the vehicle 102 can be a spacecraft. As another example, the vehicle 102 can be a land-based vehicle, such as an automobile, bus, train car, and/or the like.

The access system 100 allows for access into an internal chamber 104 within a fuselage 106 of the vehicle 102. In at least one example, the internal chamber 104 is a cargo hold within the fuselage 106. As another example, the internal chamber 104 is a passenger area within the fuselage 106. As another example, the internal chamber 104 is a flight deck or cockpit within the fuselage 106. As another example, the internal chamber 104 is a galley within the fuselage 106.

The internal chamber 104 includes an opening 108 that leads into the internal chamber 104. The access system 100 incudes a door 110 moveably coupled to the fuselage 106 within the opening 108. The door 110 is moveable between an open position, in which the opening 108 is opened to allow passage into and out of the internal chamber 104, and a closed position, in which the opening 108 is closed, thereby preventing passage into and out of the internal chamber 104.

In at least one example, the door 110 is a plug door. For example, the fuselage 106 can include a socket frame surrounding the opening 108. The plug door is configured to mate into the socket frame into a closed position. The plug door is configured to seal itself by taking advantage of pressure differences on opposite sides. Higher pressure on one side of the door forces the plug door into the socket frame, thereby providing sealing engagement, and preventing the plug door from being opened until the increased pressure is released. In at least one example, in order to open the plug door, an initial inward and upward (or optionally, downward) motion is used (in contrast to a shear door, which is merely pivoted or rotated open about one or more hinges). In at least one example, fuselage 106 includes stops on and/or within the socket frame around portions of the opening 108. In order to open the plug door, an initial outward motion is used to clear the stops, and a secondary pivotal motion is then used to open the plug door.

In at least one example, in order to open the door 110 (such as a plug door), an initial movement is inboard and up or down to clear the stops. One or more actuators 112 move the linkage(s) 116 (such as by turning) via one or more rods (such as the rod 139 (shown in FIGS. 4 and 5, for example) to provide the initial movement between the door 110 and the fuselage 106.

The access system 100 further includes one or more actuators 112 secured to the door 110. The actuator(s) 112 can be rotary motors, linear motors, and/or the like. The actuator(s) 112 is mounted onto and/or within the door 110. The actuator(s) 112 are not secured to a floor 114 of the fuselage 106. The actuator(s) 112 are separated from the floor 114. One or more linkage(s) 116 couple the door 110 to the floor 114. For example, the linkage(s) 116 connect the door 110 and/or the actuator(s) 112 to an underside of the floor 114 (such as to one or more frames, beams, or the like that form a portion of the floor 114).

In at least one example, the door 110, as a plug door, is opened by the actuator(s) 112 through two stages, such as through an initial outward pushing motion, and a secondary pivotal motion. In contrast to a shear door, in which all loading goes through the door, pressure loading in relation to a plug door occurs around the plug door, such as into a socket frame into which the plug door mates into a closed position.

The vehicle 102 can also include an access panel 118 that allows an operator to selectively open and close the door 110. The access panel 118 can be on an exterior or interior portion of the fuselage 106, and proximate to the internal chamber 104. For example, the access panel 118 can be above, below, or to a side of the opening 108, outside of the internal chamber 104. The access panel 118 can include one or more switches, buttons, keys, or the like that allow the actuator(s) 112 to be operated to selectively open and close the door 110. In at least one example, the access panel 118 includes or is in otherwise communication with a control unit 120 that is configured to control operation of the actuator(s) 112. In at least one example, the actuator(s) 112 includes the control unit 120. As another example, the control unit 120 is separate and distinct from the actuator(s) 112, and is in communication with the actuator(s) 112 through one or more wired or wireless connections. Optionally, the access system 100 does not include the access panel 118 and/or the control unit 120.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 can be or include one or more processors that are configured to control operation thereof, as described herein.

The control unit(s), such as the control unit 120, are configured to execute a set of instructions that are stored in one or more data storage units or elements (such as one or more memories), in order to process data. For example, the control unit 120 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit(s), such as the control unit 120, as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of examples herein can illustrate one or more control or processing units, such as the control unit 120. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit(s), such as the control unit 120, can represent processing circuitry such as one or more of a field programmable gate array (FPGA), application specific integrated circuit (ASIC), microprocessor(s), and/or the like. The circuits in various examples can be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As described herein, the access system 100 for the vehicle 102 includes the door 110 moveably coupled to a portion of the fuselage 106. The door 110 is configured to be moved between an open position in which the opening 108 of the internal chamber 104 is opened, and a closed position in which the opening 108 of the internal chamber 104 is closed. The one or more actuators 112 are secured to the door 110 (for example mounted on and/or within the door 110). The one or more actuators 112 are configured to move the door 110 between the open position and the closed position. In at least one example, the access system 100 also includes one or more linkages 116 coupled to the one or more actuators 112. The one or more actuators 112 are configured to move the one or more linkages 116 to move the door 110 between the open position and the closed position. In at least one example, the one or more linkages 116 connect to a portion of the floor 114 within the fuselage 106. In at least one example, the door 110 is a plug door that is configured to mate with a socket frame surrounding the opening 108 when the door 110 is in the closed position.

Figure 2:
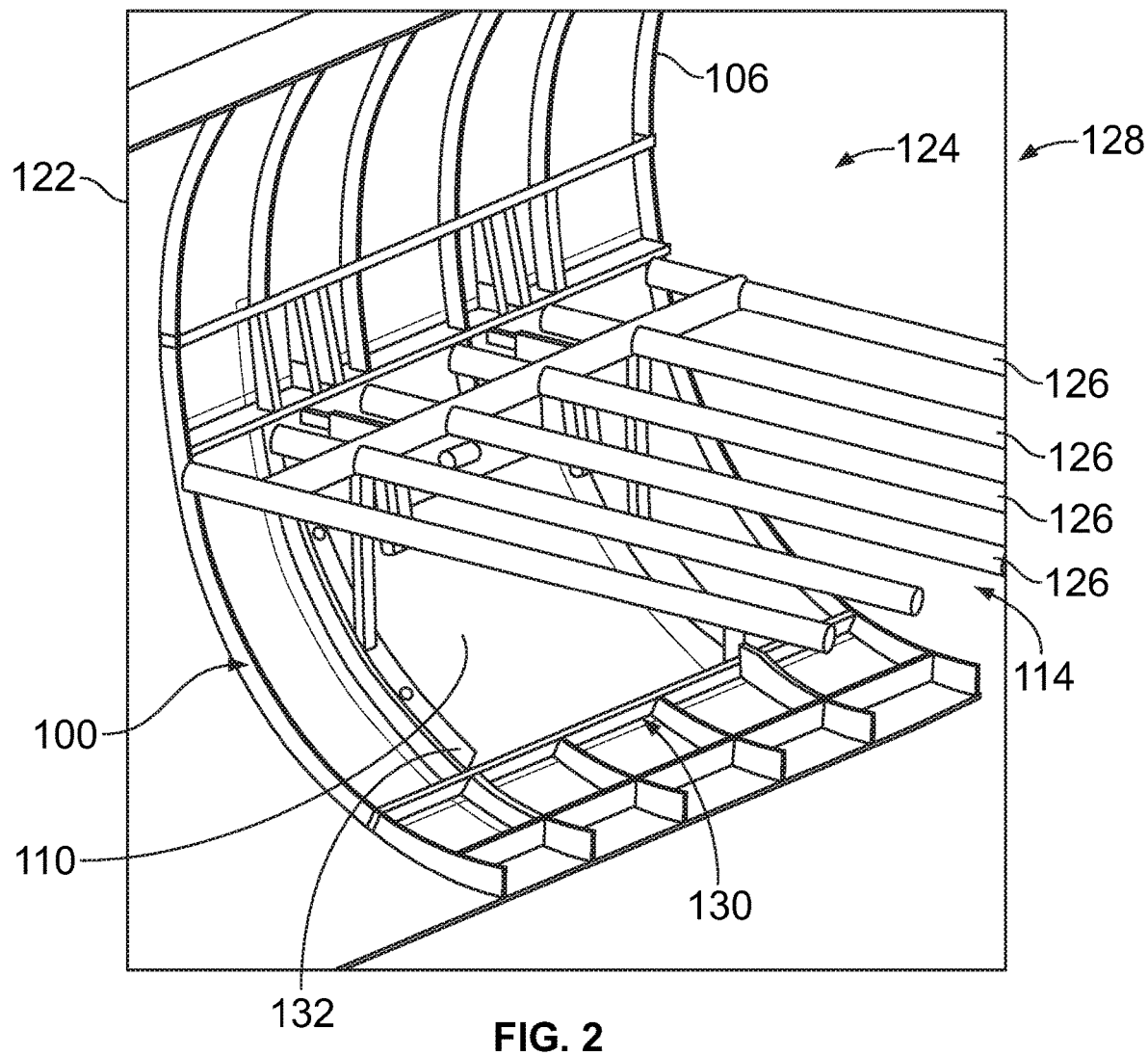
FIG. 2 illustrates an isometric top internal view of an access system within a fuselage, according to an example of the present disclosure.

FIG. 2 illustrates an isometric top internal view of the access system 100 within the fuselage 106, according to an example of the present disclosure. The fuselage 106 includes outer walls 122 that define an interior space 124. The floor 114 spans between internal surfaces of the outer walls 122 within the interior space 124. The floor 114 includes a plurality of support beams 126 (for the sake of clarity, floor panels are now shown in FIG. 2). The floor 114 separates a passenger area 128 from a cargo hold 130. The passenger area 128 is above the floor 114, and the cargo hold 130 is below the floor 114.

The access system 100 includes the door 110 that is moveable between a closed position and an open position. As shown in FIG. 2, the door 110 is in a closed position. The door 110 is a plug door that closes into a socket frame 132 surrounding the opening 108.

Figure 3:
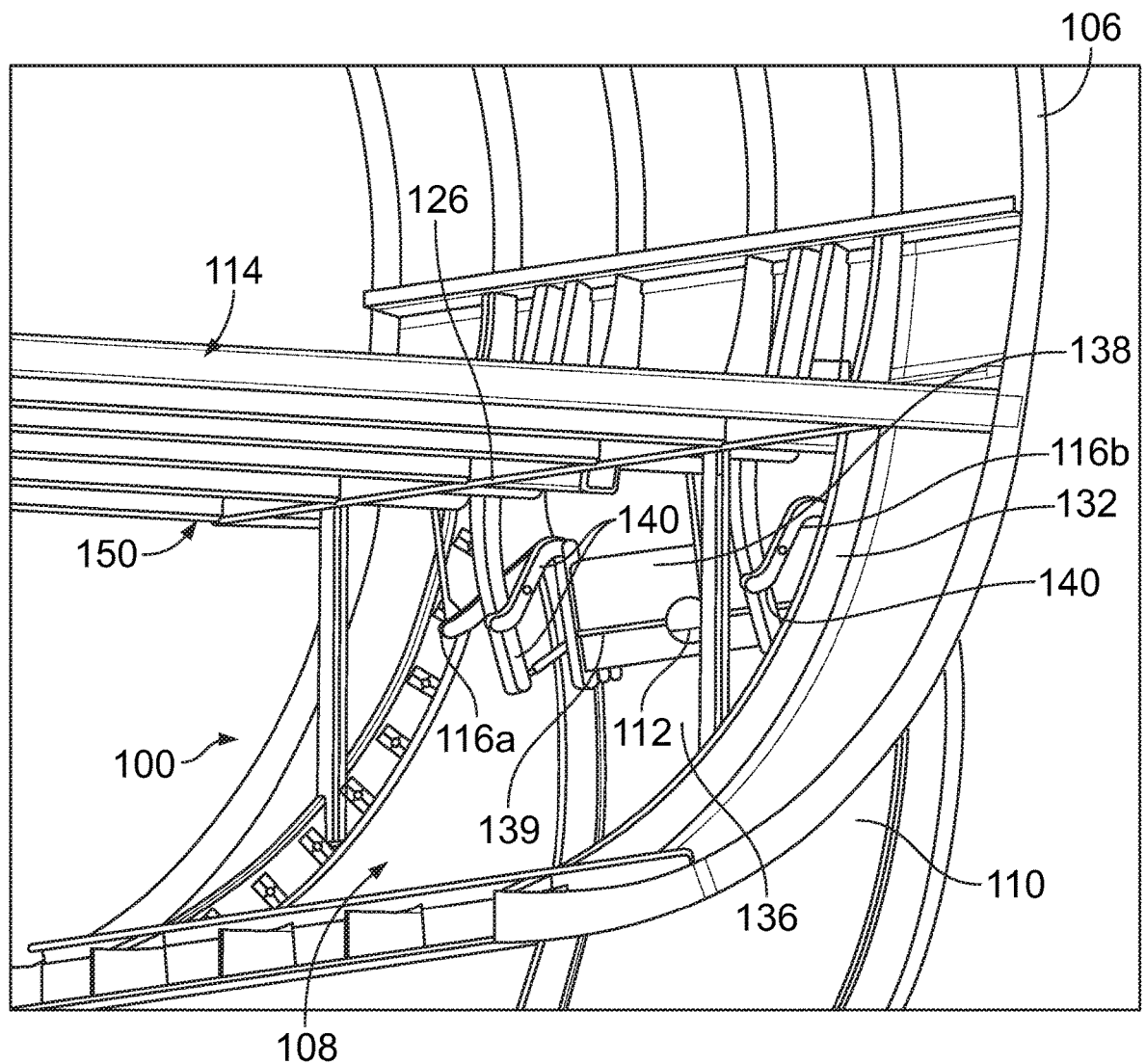
FIG. 3 illustrates an isometric internal view of the access system of FIG. 2 having a door in a partial open position.

FIG. 3 illustrates an isometric internal view of the access system 100 of FIG. 2 having the door 110 in a partial open position. The access system 100 includes an actuator 112 mounted onto an internal surface 136 of the door 110. For example, a mounting plate 138 is secured to (for example, mounted on or to) the internal surface 136 of the door 110, such as through one or more fasteners, adhesives, and/or the like. The mounting plate 138 can be capable of moving independently of the door 110, and/or connected to the door 110 with one or more linkages. The actuator 112 is secured to the mounting plate 138, such as through one or more fasteners, adhesives, and/or the like. In at least one example, the actuator 112 is a rotary motor coupled to a rod 139, which is coupled to a first linkage 116a and a second linkage 116b opposite from the first linkage 116a. The first linkage 116a and the second linkage 116b include a plurality of arms 140, which can be pivotally coupled together via pivot pins, such as at ends thereof. The rod 139 can, in turn, be coupled to one or more pistons, drive screws, and/or the like that are configured to drive motion of the first linkage 116a and the second linkage 116b. The first linkage 116 and the second linkage 116 are, in turn, secured to an underside 150 of the floor 114, such as to lower surfaces of one or more support beams 126, such as through brackets, fasteners, adhesives, and/or the like. As shown, the actuator 112 is secured to the door 110, but not the floor 114.

Figure 4:
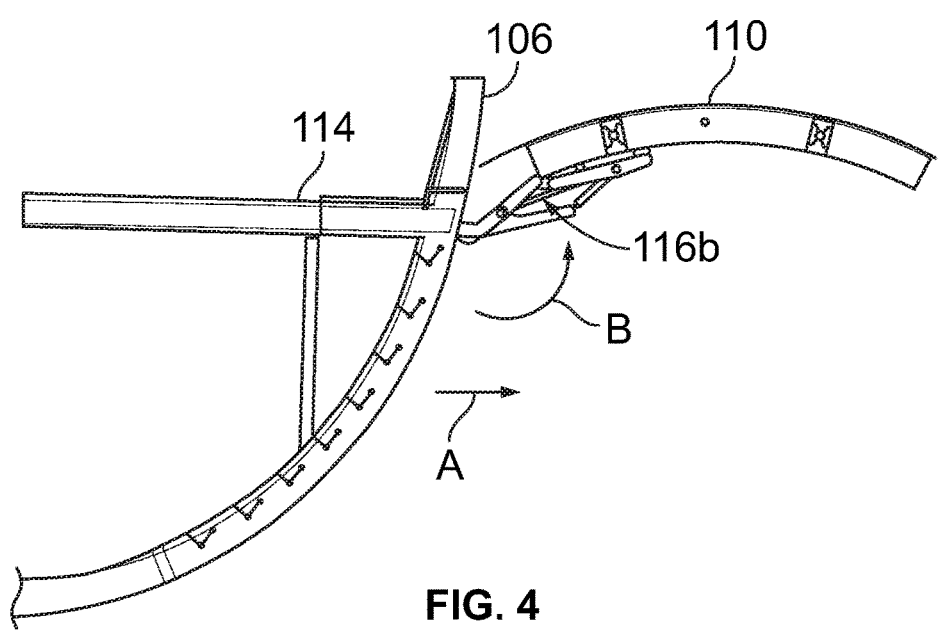
FIG. 4 illustrates a lateral view of the access system of FIG. 2 having the door in a fully open position.

FIG. 4 illustrates a lateral view of the access system 100 of FIG. 2 having the door 110 in a fully open position. Referring to FIGS. 2-4, the door 110 is a plug door that is configured to open and close in relation to the socket frame 132. The actuator 112 operates to drive the rod 139, which in turn drives motion of the first linkage 116a and the second linkage 116 to first linearly and outwardly move the door 110 away from the socket frame 132 in the direction of arrow A into an initial position, and then pivotally move the door 110 into the open position in the direction of arc B. Because the actuator 112 is secured to the door 110, instead of the floor 114, a smaller and/or lighter floor can be used, as there is no need to support the actuator with respect to the floor 114. Further, it has been found that mounting the actuator 112 to the door 110, instead of the floor, leads to a move efficient manufacturing process that is less time and labor intensive. Further, a smaller floor provides a smaller cross-section of an aircraft, which reduces weight of the aircraft, and drag during flight.

Figure 5:
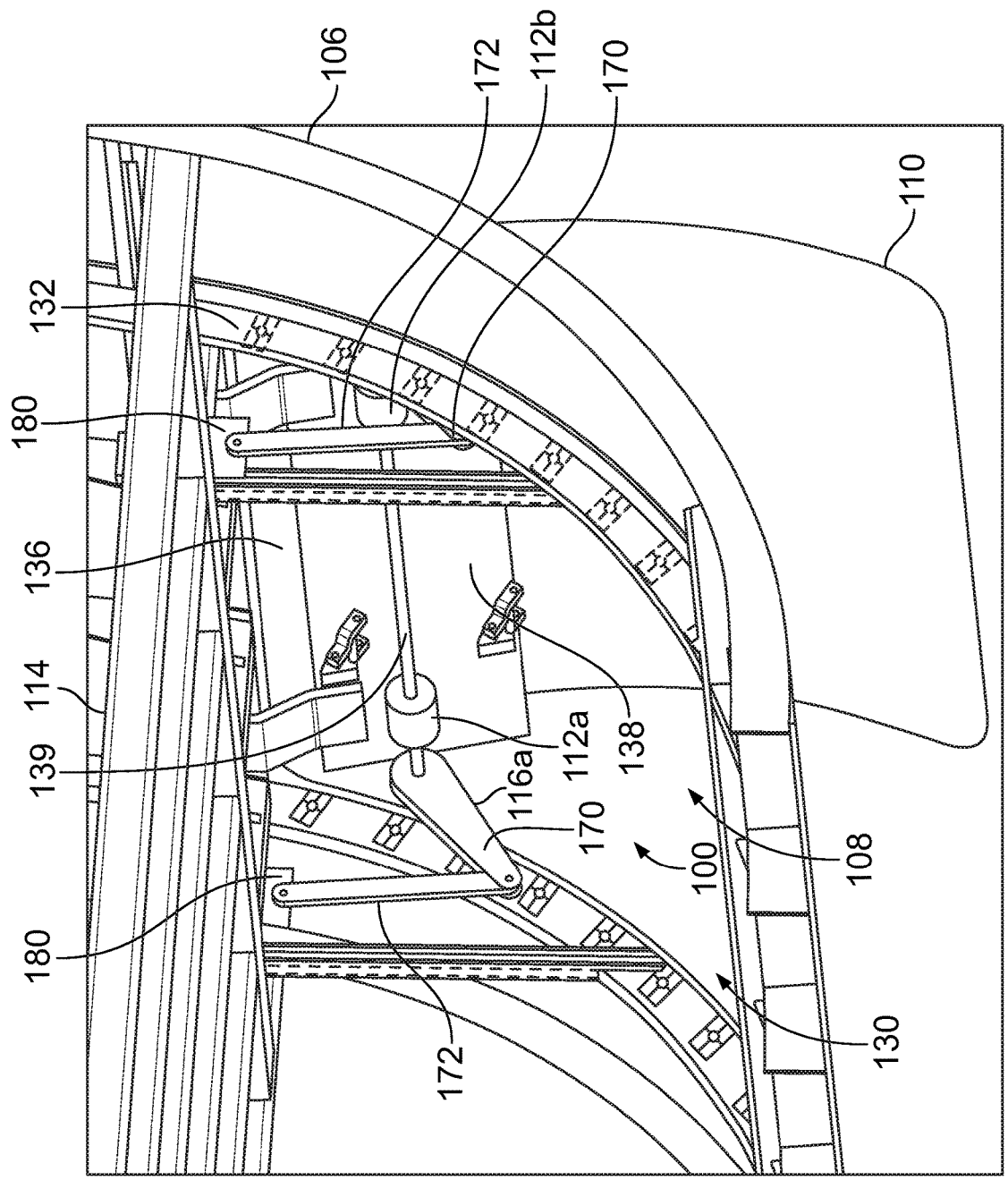
FIG. 5 illustrates an isometric internal view of the access system having a door in a partial open position.
Figure 6:
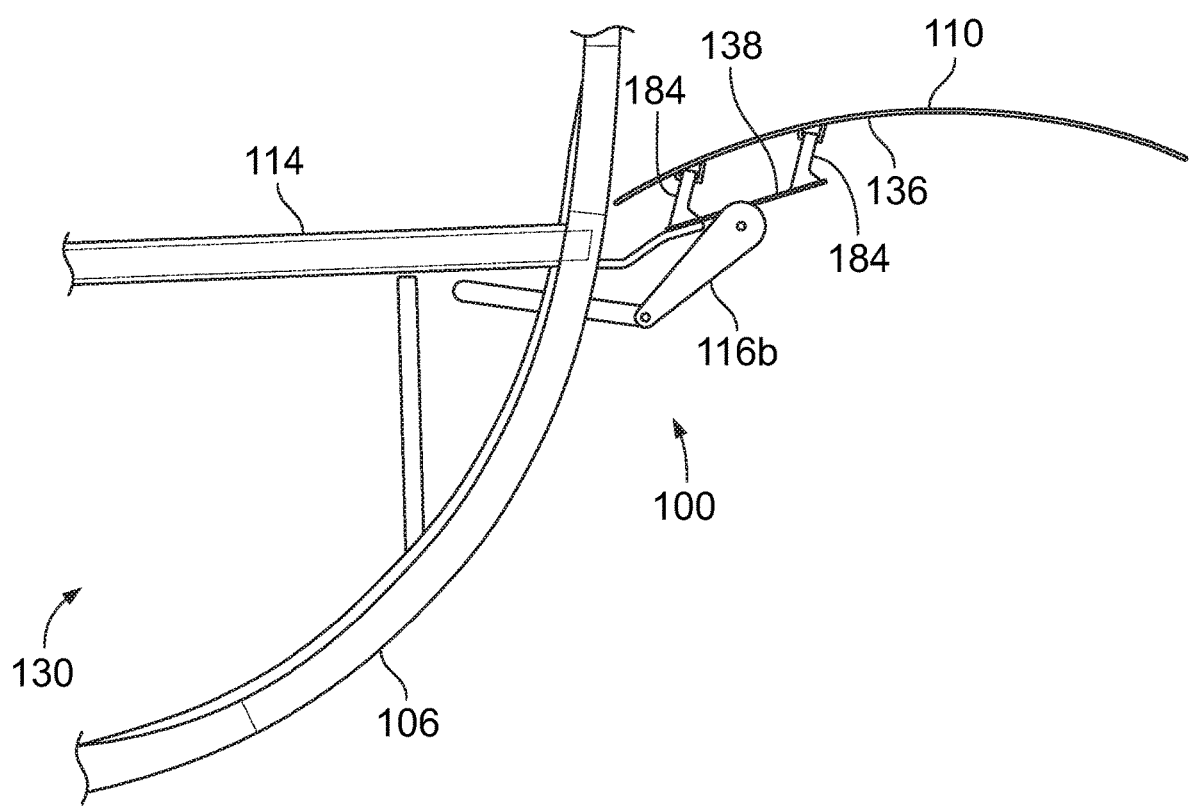
FIG. 6 illustrates a lateral view of the access system of FIG. 5 having the door in a fully open position.

FIG. 5 illustrates an isometric internal view of the access system 100 having a door in a partial open position. FIG. 6 illustrates a lateral view of the access system 100 of FIG. 6 having the door in a fully open position. Referring to FIGS. 5 and 6, in at least one example, the access system 100 includes the door 110, such as a plug door that is configured to open and close in relation to the socket frame 132. The mounting plate 138 is secured to the internal surface 136 of the door 110. A first actuator 112a and a second actuator 112b are secured proximate to opposite sides of the mounting plate 138. The rod 139 connects the first actuator 112a to the second actuator 112b. Optionally, a rod may not connect the first actuator 112a to the second actuator 112b.

The first actuator 112a is operatively coupled to the first linkage 116a, and the second actuator 112b is operatively coupled to the second linkage 116b. The first linkage 116a and the second linkage 116b can include one or more pivotal arms 170 and 172, which connect to the underside of the floor 114, such as via brackets 180. The actuators 112a and 112b can be rotary motors that are configured to drive motion of the linkages 116a and 116b to move the door 110, which is a plug door, between open and closed positions. As shown in FIG. 6, the mounting plate 138 can mount to the internal surface 136 of the door 110, such as through a plurality of brackets 184 and/or linkages 116.

Figure 7:
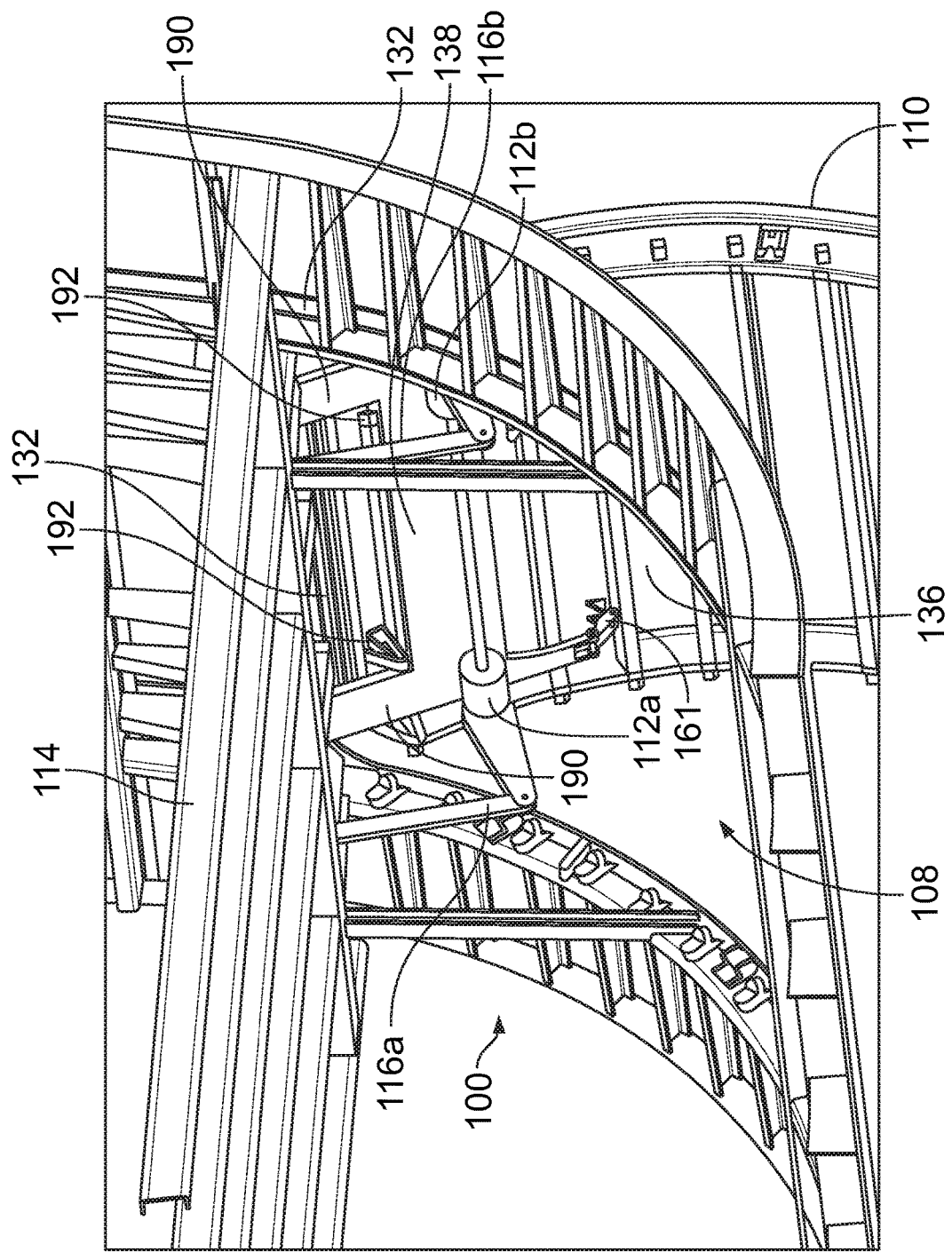
FIG. 7 illustrates an isometric internal view of the access system having a door in a partial open position.
Figure 8:
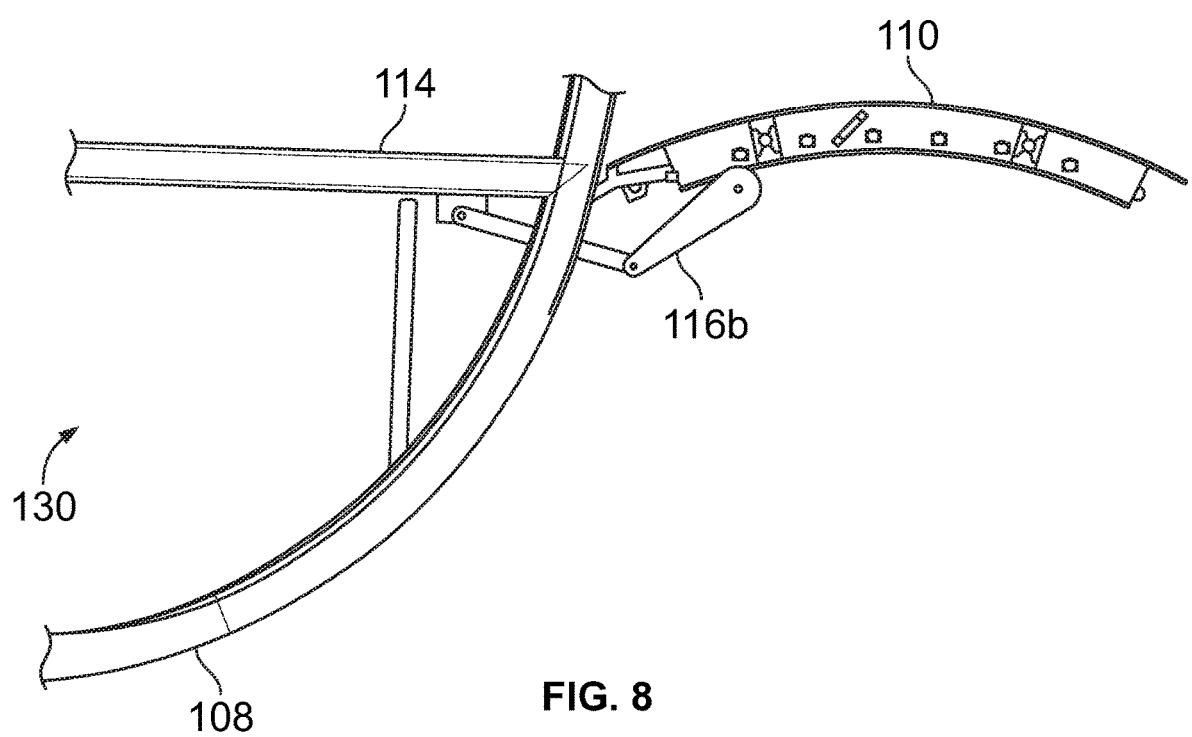
FIG. 8 illustrates a lateral view of the access system of FIG. 7 having the door in a fully open position.

FIG. 7 illustrates an isometric internal view of the access system 100 having the door 110 in a partial open position. FIG. 8 illustrates a lateral view of the access system 100 of FIG. 7 having the door 110 in a fully open position. Referring to FIGS. 7 and 8, the mounting plate 138 can further be pivotally coupled to a portion of the socket frame 132 above the opening 138, and to pivot brackets 191 extending inwardly from the internal surface 136. The mounting plate 138 can include legs 190 that are configured to move through tracks 192 on the internal surface 136 of the door 110. As shown, the access system 100 includes two actuators 112a and 112b operatively coupled to respective linkages 116a and 116b, as described above.

Figure 9:
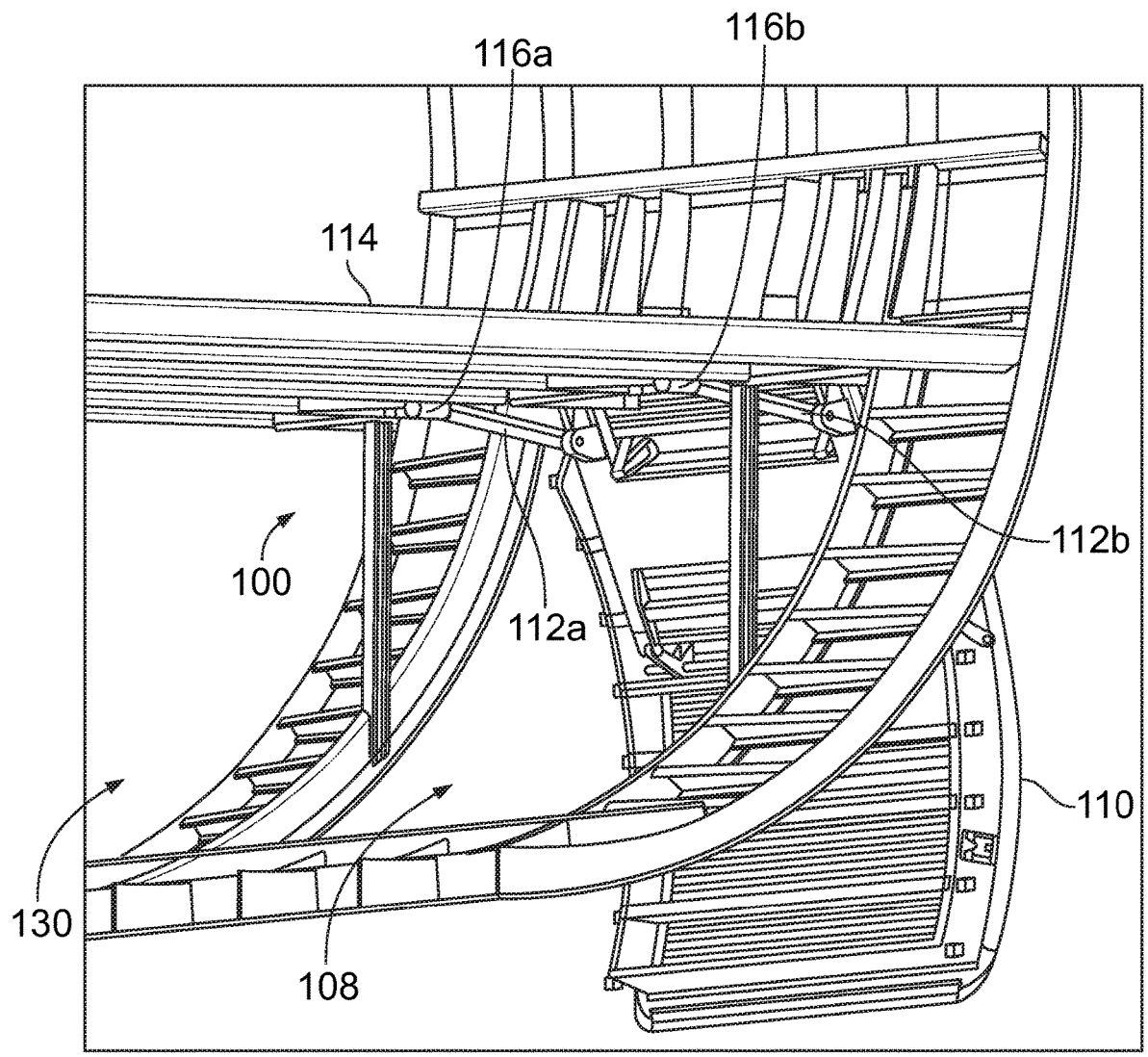
FIG. 9 illustrates an isometric internal view of the access system having a door in a partial open position.
Figure 10:
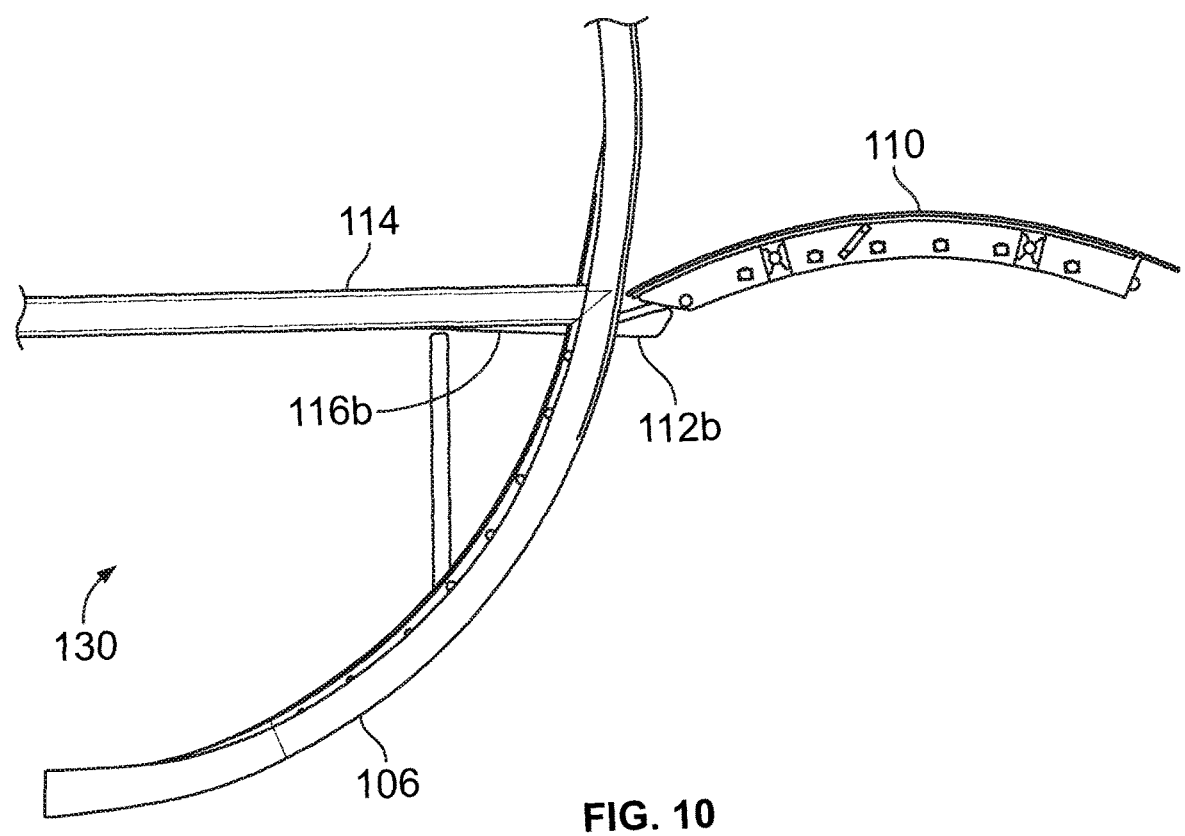
FIG. 10 illustrates a lateral view of the access system of FIG. 9 having the door in a fully open position.

FIG. 9 illustrates an isometric internal view of the access system 100 having the door 110 in a partial open position. FIG. 10 illustrates a lateral view of the access system of FIG. 9 having the door 110 in a fully open position. Referring to FIGS. 9 and 10, in this example, the actuators 112a and 112b can be linear motors secured to door 110. Again, the actuators 112a and 112b are not mounted onto an underside of the floor 114, but are coupled to linkages 116a and 116b that connect to the floor 114.

Figure 11:
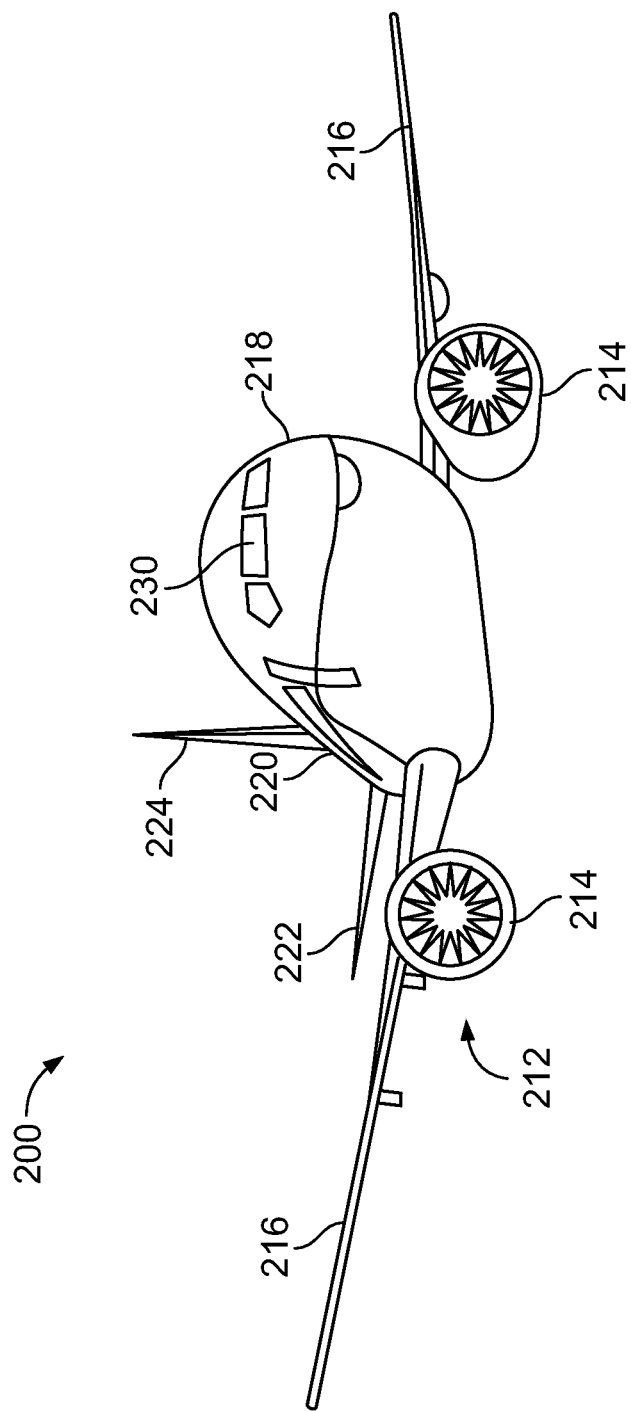
FIG. 11 illustrates a perspective front view of an aircraft, according to an example of the present disclosure.

FIG. 11 illustrates a perspective front view of an aircraft 200, according to an example of the present disclosure. The aircraft 200 is an example of the vehicle 102, shown in FIG. 1. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224.

The fuselage 218 of the aircraft 200 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, examples of the present disclosure may be used with various other vehicles, such as automobiles, buses, locomotives and train cars, watercraft, spacecraft, and the like. Further, examples of the present disclosure may be used with respect to fixed structures, such as commercial and residential buildings.

Figure 12:
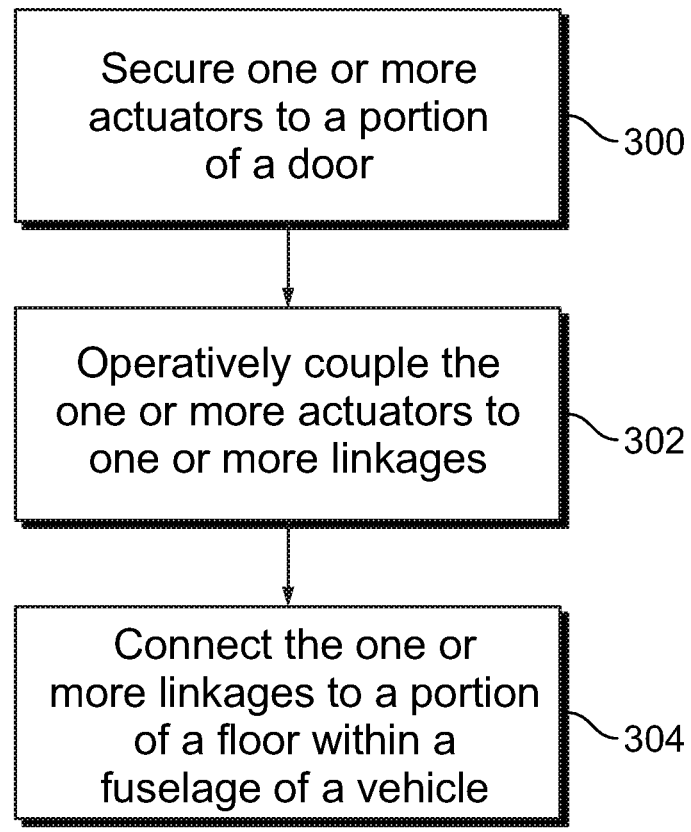
FIG. 12 illustrates a flow chart of a method of manufacturing an access system for a vehicle, according to an example of the present disclosure.

FIG. 12 illustrates a flow chart of a method of manufacturing an access system for a vehicle, according to an example of the present disclosure. Referring to FIGS. 1 and 12, at 300, one or more actuators 112 are secured to a portion of a door 110. In at least one example, the door 110 is a plug door. At 302, the one or more actuators 112 are operatively coupled to one more linkages 116. At 304, the one or more linkages 116 are connected to a portion of a floor 114 within a fuselage 106 of a vehicle 102. Optionally, the one or more linkages 116 can first be connected to the portion of the floor 114. The actuator(s) 112 can then be operatively coupled to the linkage(s) 116.

Referring to FIGS. 1-12, examples of the present disclosure provide access systems 100 that include a door 110. In at least one example, the door 110 is a plug door (in contrast to a shear door). The access systems 100 includes one or more actuators 112 that are secured to (for example, mounted to and/or within) the door 110, instead of being mounted to the floor 114.

Further, the disclosure comprises examples according to the following clauses:

Clause 1. An access system for a vehicle, the access system comprising:
 a door moveably coupled to a portion of a fuselage, wherein the door is configured to be moved between an open position in which an opening of an internal chamber is opened, and a closed position in which the opening of the internal chamber is closed; and
 one or more actuators secured to the door, wherein the one or more actuators are configured to move the door between the open position and the closed position.

Clause 2. The access system of Clause 1, further comprising one or more linkages coupled to the one or more actuators, wherein the one or more actuators are configured to move the one or more linkages to move the door between the open position and the closed position.

Clause 3. The access system of Clause 2, wherein the one or more linkages connect to a portion of a floor within the fuselage.

Clause 4. The access system of Clause 3, wherein the one or more linkages connect to an underside of the portion of the floor.

Clause 5. The access system of any of Clauses 1-4, wherein the one or more actuators are separated from a floor within the fuselage.

Clause 6. The access system of any of Clauses 1-5, wherein the door is a plug door that is configured to mate with a socket frame surrounding the opening when the door is in the closed position.

Clause 7. The access system of any of Clauses 1-6, wherein the internal chamber comprises a cargo hold of the vehicle.

Clause 8. The access system of any of Clauses 1-7, wherein the vehicle is an aircraft.

Clause 9. The access system of any of Clauses 1-8, wherein the one or more actuators comprise one or more rotary motors.

Clause 10. The access system of any of Clauses 1-9, wherein the one or more actuators comprise one or more linear motors.

Clause 11. The access system of any of Clauses 1-10, further comprising a control unit configured to control operation of the one or more actuators.

Clause 12. The access system of any of Clauses 1-11, wherein the one or more actuators are secured to a mounting plate that is mounted on an internal surface of the door.

Clause 13. A method of manufacturing an access system for a vehicle, the method comprising:
coupling a door to a portion of a fuselage, wherein the door is configured to be moved between an open position in which an opening of an internal chamber is opened, and a closed position in which the opening of the internal chamber is closed; and
securing one or more actuators to the door, wherein the one or more actuators are configured to move the door between the open position and the closed position.

Clause 14. The method of Clause 13, further comprising coupling one or more linkages to the one or more actuators, wherein the one or more actuators are configured to move the one or more linkages to move the door between the open position and the closed position.

Clause 15. The method of Clauses 13 or 14, further comprising connecting the one or more linkages to a portion of a floor within the fuselage, wherein the one or more actuators are separated from the floor.

Clause 16. The method of any of Clauses 13-15, wherein the door is a plug door that is configured to mate with a socket frame surrounding the opening when the door is in the closed position.

Clause 17. An aircraft comprising:
a fuselage including a floor over a cargo hold having an opening formed in the fuselage; and
an access system comprising:
a plug door moveably coupled to a socket frame surrounding the opening, wherein the plug door is configured to be moved between an open position in which the opening is opened, and a closed position in which the opening is closed;
one or more actuators secured to the door, wherein the one or more actuators are configured to move the door between the open position and the closed position; and
one or more linkages coupled to the one or more actuators, wherein the one or more actuators are configured to move the one or more linkages to move the door between the open position and the closed position, wherein the one or more linkages connect to an underside of the floor, and wherein the one or more actuators are separated from the floor.

Clause 18. The aircraft of Clause 17, wherein the one or more actuators comprise one or more rotary motors.

Clause 19. The aircraft of Clauses 17 or 18, wherein the one or more actuators comprise one or more linear motors.

Clause 20. The aircraft of any of Clauses 17-19, wherein the one or more actuators are secured to a mounting plate that is mounted on an internal surface of the door.

As explained herein, certain examples of the present disclosure provide a door of a vehicle, such as a commercial aircraft, that can be efficiently manufactured. Further, examples of the present disclosure provide a plug door of a vehicle that allows for increased space and capacity within an internal cabin. Also, examples of the present disclosure provide a plug door that exerts less stress and fatigue on a floor of a vehicle. Additionally, examples of the present disclosure provide efficient and effective methods of manufacturing a plug door of a vehicle. Also, examples of the present disclosure provide efficient methods of operating a plug door of a vehicle.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An access system for a vehicle, the access system comprising:
   a plug door moveably coupled to a portion of a fuselage, wherein the plug door is configured to be moved between an open position in which an opening of an internal chamber is opened, and a closed position in which the opening of the internal chamber is closed, wherein the plug door is configured to mate with a socket frame surrounding the opening when the plug door is in the closed position; and
   one or more actuators mounted to the plug door, wherein the one or more actuators are configured to move the plug door between the open position and the closed position.

2. The access system of claim 1, wherein the one or more actuators are separated from a floor within the fuselage.

3. The access system of claim 1, wherein the internal chamber comprises a cargo hold of the vehicle.

4. The access system of claim 1, wherein the vehicle is an aircraft.

5. The access system of claim 1, wherein the one or more actuators comprise one or more rotary motors.

6. The access system of claim 1, wherein the one or more actuators comprise one or more linear motors.

7. The access system of claim 1, further comprising a control unit configured to control operation of the one or more actuators.

8. The access system of claim 1, wherein the one or more actuators are secured to a mounting plate that is mounted on an internal surface of the plug door.

9. The access system of claim 1, wherein the one or more actuators comprise one or more rotary motors coupled to a rod, wherein the rod is coupled to a first linkage and a second linkage opposite from the first linkage, wherein each of the first linkage and the second linkage comprises a plurality of arms, wherein the one or more rotary motors are configured to operate the drive rod, which in turn drives motion of the first linkage and the second linkage to linearly and outwardly move the plug door away from the socket frame into an initial position, and then pivotally move the plug door from the initial position into the open position.

10. The access system of claim 1, further comprising one or more linkages coupled to the one or more actuators, wherein the one or more actuators are configured to move the one or more linkages to move the plug door between the open position and the closed position.

11. The access system of claim 10, wherein the one or more linkages connect to a portion of a floor within the fuselage.

12. The access system of claim 11, wherein the one or more linkages connect to an underside of the portion of the floor.

13. A method of manufacturing an access system for a vehicle, the method comprising:
   coupling a plug door to a portion of a fuselage, wherein the plug door is configured to be moved between an open position in which an opening of an internal chamber is opened, and a closed position in which the opening of the internal chamber is closed, wherein the plug door is configured to mate with a socket frame surrounding the opening when the plug door is in the closed position; and
   mounting one or more actuators to the plug door, wherein the one or more actuators are configured to move the door between the open position and the closed position.

14. The method of claim 13, further comprising coupling one or more linkages to the one or more actuators, wherein the one or more actuators are configured to move the one or more linkages to move the plug door between the open position and the closed position.

15. The method of claim 13, further comprising connecting the one or more linkages to a portion of a floor within the fuselage, wherein the one or more actuators are separated from the floor.

16. An aircraft comprising:
   a fuselage including a floor over a cargo hold having an opening formed in the fuselage; and
   an access system comprising:
      a plug door moveably coupled to a socket frame surrounding the opening, wherein the plug door is configured to be moved between an open position in which the opening is opened, and a closed position in which the opening is closed;
      one or more actuators mounted to the door, wherein the one or more actuators are configured to move the door between the open position and the closed position; and
      one or more linkages coupled to the one or more actuators, wherein the one or more actuators are configured to move the one or more linkages to move the door between the open position and the closed position, wherein the one or more linkages connect to an underside of the floor, and wherein the one or more actuators are separated from the floor.

17. The aircraft of claim 16, wherein the one or more actuators comprise one or more rotary motors.

18. The aircraft of claim 16, wherein the one or more actuators comprise one or more linear motors.

19. The aircraft of claim 16, wherein the one or more actuators are secured to a mounting plate that is mounted on an internal surface of the door.

20. The aircraft of claim 16, wherein the one or more actuators comprise one or more rotary motors coupled to a rod, wherein the one or more linkages comprise a first linkage and a second linkage opposite from the first linkage, wherein the rod is coupled to the first linkage and the second linkage, wherein each of the first linkage and the second linkage comprises a plurality of arms, wherein the one or more rotary motors are configured to operate the drive rod, which in turn drives motion of the first linkage and the second linkage to linearly and outwardly move the plug door away from the socket frame into an initial position, and then pivotally move the plug door from the initial position into the open position.

* * * * *